Patented Feb. 22, 1949

2,462,811

UNITED STATES PATENT OFFICE 2,462,811

PROTEIN WATER PAINT VEHICLES HAVING INCREASED WET ABRASION RESISTANCE

James C. Konen and Burton W. Schroeder, Minneapolis, Minn., assignors to Archer-Daniels-Midland Company, a corporation of Delaware No Drawing. Application October 18, 1944,
Serial No. 559,239

4 Claims. (Cl. 106—154)

This invention relates to a protein composition and particularly to such composition adapted for use in making hard films or shaped masses.

Since the present composition is particularly suitable in making water-reducible paints, the invention will be illustrated first by detailed description in connection with such paints.

Water paints ordinarily contain a protein material, lime, pigment, an anti-foaming agent, and a preservative to protect against molds. The composition is mixed with water to give the proper consistency for application to a surface.

Films left upon drying by evaporation of water and hardened somewhat by the reaction of the lime and protein have the great disadvantage of being penetrable to water to an objectionable extent and showing a low resistance to abrasion when wet. Only the low cost and ease of application offset for some purposes the absence of adequate hardness of film and resistance to water penetration and result in wide use of the water paints.

The use of wetting agents in water paints, while improving the ease of mixing with water and the smoothness of the resulting emulsion, increases the penetrability to water and therefore decreases the resistance to abrasion of a film in contact with water, all as would be expected from the lowering of the surface tension of water in contact with solids of the film.

We have now discovered one particular class of wetting agents and only this one class that has an effect that is the opposite of the expected. This class of wetting agents increases the hardness and increases the wet abrasion resistance. These wetting agents are the polymerized alkali metal salts of arylalkyl sulfonic acids.

The invention comprises a composition of matter including an alkali dispersible vegetable protein material, a metal compound serving as protein insolubilizing agent, and a heat polymerized salt of an arylalkyl sulfonic acid serving as a hardening agent. The invention comprises also the method of hardening a protein by contacting it with the said salt, suitably in the presence of calcium hydroxide. In the preferred embodiment, the invention includes a water paint (this term embracing powder to be dispersed in water to give the finished paint) containing soybean or other alkali dispersible vegetable protein, lime or like protein insolubilizing agent, and the salt of a sulfonic acid, the salt being a polymerized alkali metal salt of an aryl-lower-alkyl sulfonic acid. Water paints made according to the invention may include also other ingredients that are conventional in water paints, as, for example, anti-foaming and preservative materials along with any inerts and pigments required to establish the color desired.

One effect of the inclusion of the hardening agent selected from the salts of the arylalkyl sulfonic acids is to increase wet abrasion resistance of the dried film as measured by the standard test to at least 3 or 4 times what it is for a similar film not including the sulfonic acid salt as film hardening agent.

The film hardening agent is a polymerized water soluble salt of an aryl-lower-alkyl sulfonic acid. Alkali metal salts are preferred. The sodium salt is entirely satisfactory and is ordinarily selected although the more expensive salts such as the potassium salt may be used.

Such salts of sulfonic acid used are polymers of monomers illustrated by the type formula $(A.R.A')SO_3M$, in which A and A' designate two or more aromatic groups, which may be alike or different, joined to an aliphatic nucleus R which may consist of a single alkyl group or a plurality of alkyl groups associated in straight chain or branched chain formation; and in which $SO_3M$ designates at least one solubilizing group such as the free sulfonic acid group or this group in combination with a soluble salt forming metal or radical. Members of the class may be synthesized as described in U. S. Patent 2,141,569 issued to Tucker on December 27, 1938.

Members of this class of compounds that are particularly effective for the present purpose are compounds obtained by condensing sulfonic acids of naphthalene, its homologs or derivatives with formaldehyde or its equivalents, to give products considered to be derivatives of dinaphthylmethane or its homologs. A particularly satisfactory material is the product of condensing beta-naphthalene sulfonic acid with formaldehyde as described in the said patent.

A specific example of such salt that is particularly satisfactory for the purpose is the sodium salt of a polymerized naphthyl-lower-alkyl sulfonic acid sold under the trade name Daxad 11. This salt is used hereinafter for the further and more detailed illustration of the invention. Daxad 11 as ordinarily used is light brown amorphous powder giving with water a somewhat hazy solution of light tan color with which lime does not give a precipitate.

Other members of this class of compounds may be made from the raw materials and under the conditions described in the said Patent 2,141,569 particularly in the passage on page 2, beginning with column 1, line 15, and ending with line 57 of column 2. There may be used, in place of the naphthalene sulfonic acid, the sulfonic acid compounds of diphenyl or anthracene with formaldehyde or equivalents as stated in the patent. The mixture of the selected sulfonic acid compound and aldehyde is treated as described, including heating to cause thickening and give the controlled polymerization. The material after the polymerization is treated with alkali, to give a product referred to herein for convenience as a polymerized salt, the polymerization being considered as characteristic particularly of the non-metallic part of the complete metal salt.

The protein material used is preferably one derived from soybean, as, for instance, a high protein content soya flour that has been obtained by the low temperature extraction of oil from the flour without denaturing the protein. Other protein material that may be used includes soybean meal, isolated soybean protein, casein, cottonseed meal, and peanut meal. The soybean products are in good supply at a satisfactory price and give particularly hard and water resistant films when used in connection with lime and the film hardening agent. The soya protein products are therefore preferred. The protein of these ingredients of our composition is known to be alkali dispersible in water to get either a true or colloidal solution.

The lime used to cause insolubilizing of the protein of the soybean flour or the like is ordinarily in the form of hydrated lime. Such lime is easily obtained in finely divided condition and is entirely satisfactory for the purpose. Other forms of lime may be used. Thus there may be used quick lime in pulverized form or a mixture of calcium hydroxide and magnesium hydroxide such as formed by calcining, slaking, and pulverizing dolomitic limestone. With lime so effective and so readily available, there is no need to substitute any other protein insolubilizing material.

Preservatives, anti-foaming agents, and other added ingredients may be those that are usual in soybean protein, casein, and like water paints.

Thus, there may be used as preservative, particularly to prevent growth of molds, such material as sodium orthophenylphenol, sodium pentachlorophenol, and sodium chlorophenyl-phenol.

As anti-foaming agents there may be used to advantage pine oil, diethyl phthalate, octyl alcohol, methyl stearate, and other materials conventionally used for this purpose, the object being to decrease the porosity of the films of the protein composition when applied and dried over a surface to be painted.

Pigments and inerts that are usual and that may be used include titanium dioxide, barytes, china clay, and the like or mixtures of them.

The film hardening agent of which the Daxad 11 is the preferred example is used to advantage in the proportion of about 0.5% to 4% of the total composition on the dry basis. Larger quantities may be used but are unnecessary and uneconomical. Ordinarily proportions of around 1% to 3% are preferred. Proportions much less than ½% or 1% do not give as hard and abrasion resistant films as desired for most purposes.

Proportions of the conventional ingredients of the water paint are about those that are usual in such compositions. The lime is ordinarily used in the proportion of about 20 to 50 parts for 100 parts of the protein material present. Amounts substantially in excess of 50% of hydrated lime on the weight of the high protein content soya flour (containing actually around 50% protein) do not greatly improve the beneficial effects as to appearance of the finished dried film or resistance to abrasion. When amounts substantially less than 20 parts of lime for 100 parts of protein material are used, the washability and resistance to wet abrasion are appreciably decreased. Forty to 50 parts lime give best results.

The invention will be further illustrated by the following specific example of the practice of it.

There is made a composition including the following materials in the proportions shown.

| Ingredients | Parts by Weight |
|---|---|
| High protein content soya flour | 30 |
| Hydrated lime (protein insolubilizing agent) | 12 |
| Daxad 11 (film hardening agent) | 2.5 |
| Barytes (pigment and inert) | 60 |
| China clay (pigment and inert) | 60 |
| Titanium dioxide (pigment) | 80 |
| Pine oil (anti-foaming agent) | 5 |
| Dowicide G (preservative) | 1.5 |

A composition so made may be packaged in powder form and then dispersed in water to make a water paint ready to apply in usual manner. A water paint so made and applied to a test surface gave a hard, durable, washable film of excellent appearance. When tested for wet abrasion resistance with a weighted swinging abrading brush, according to the requirement of Federal Specification TT-P-88, the dried film withstood 4,000 oscillations of the brush as against only 1,200 oscillations for a film of exactly comparable formula differing only in the omission of the Daxad 11 from the second formula.

Compositions of the kind described are useful, not only as paint powders, but also for other purposes including wall board coatings and paper sizes.

It will be understood also that it is intended to cover all changes and modifications of the example of the invention herein chosen for the purpose of illustration which do not constitute departures from the spirit and scope of the invention.

What we claim is:

1. A vehicle for a water paint consisting essentially of an alkali dispersible vegetable protein material, lime as a protein insolubilizing agent, and a heat polymerized alkali metal salt of the condensation product of an aryl alkyl sulfonic acid with formaldehyde, the said salt being initially water soluble, in amount to increase wet abrasion resistance of a film made from the vehicle, and having the structure represented by the type formula $(A.R.A')SO_3M$ in which A and A' designate aromatic groups, R is a lower alkyl group, and $SO_3M$ a sulfonic acid group in combination with a soluble salt forming metal represented by M.

2. A vehicle as described in claim 1, the said salt being a heat polymerized alkali metal salt of the condensation product of a naphthyl sulfonic acid with formaldehyde.

3. A vehicle as described in claim 1, the proportion of the said alkali metal salt being 0.5 to 4 parts for 100 parts of the said vehicle on the dry basis.

4. A vehicle as described in claim 1, the said protein being high protein content soya flour.

JAMES C. KONEN.
BURTON W. SCHROEDER.

(References on following page)

REFERENCES CITED

The following references are of record in the file of this patent:

UNITED STATES PATENTS

| Number | Name | Date |
|---|---|---|
| 974,448 | Supf | Nov. 1, 1910 |
| 1,336,759 | Schmidt | Apr. 13, 1920 |
| 1,835,422 | Nusslein | Dec. 8, 1931 |
| 1,947,497 | Scholz et al. | Feb. 20, 1934 |
| 1,959,185 | Wappes et al. | May 15, 1934 |
| 2,141,569 | Tucker | Dec. 27, 1938 |
| 2,352,922 | Thomas et al. | July 4, 1944 |

FOREIGN PATENTS

| Number | Country | Date |
|---|---|---|
| 112,209 | Australia | Jan. 11, 1941 |
| 115,770 | Australia | Sept. 3, 1942 |